(12) United States Patent
Pei

(10) Patent No.: US 8,404,074 B2
(45) Date of Patent: Mar. 26, 2013

(54) CONDUCTIVE FILM AND METHOD FOR MAKING SAME

(75) Inventor: Shao-Kai Pei, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 290 days.

(21) Appl. No.: 12/854,907

(22) Filed: Aug. 12, 2010

(65) Prior Publication Data

US 2011/0266028 A1 Nov. 3, 2011

(30) Foreign Application Priority Data

Apr. 29, 2010 (TW) .............................. 99113727 A

(51) Int. Cl.
*B24D 11/00* (2006.01)
*B29C 65/00* (2006.01)
*B32B 37/00* (2006.01)
*B32B 27/00* (2006.01)
*H01B 5/00* (2006.01)

(52) U.S. Cl. .................... 156/280; 156/279; 174/126.1; 977/742

(58) Field of Classification Search .................. 156/279, 156/280; 174/126.1; 977/742
See application file for complete search history.

(56) References Cited

U.S. PATENT DOCUMENTS

2007/0045593 A1 * 3/2007 Yasuda et al. ................. 252/500

* cited by examiner

*Primary Examiner* — Michael Orlando
(74) *Attorney, Agent, or Firm* — Altis Law Group, Inc.

(57) ABSTRACT

A method for making a conductive film includes: providing a carbon nanotube film defining a plurality of holes therein; attaching the carbon nanotube film on a substrate; adjusting a temperature of the carbon nanotube film in a range from about 7° C. to about 9° C.; dropping and rubbing a nanoparticle aqueous solution in the carbon nanotube film, the nanoparticles aqueous solution containing a plurality of nanoparticles; and adjusting the temperature of the carbon nanotube film in a range from about 24° C. to about 26° C. and drying the carbon nanotube film to obtain the conductive film on the substrate.

8 Claims, 3 Drawing Sheets

CONDUCTIVE FILM AND METHOD FOR MAKING SAME

BACKGROUND

1. Technical Field

The present disclosure relates to conductive films and methods for making the same.

2. Description of Related Art

Conductivity of carbon nanotubes makes them possible to be used as conductive films. Generally, in such conductive film, the carbon nanotubes interconnect with each other to form an electrically conductive framework. However, holes exist in the conductive framework. This reduces a conductivity of the carbon-nanotube conductive film.

Therefore, what is needed is a conductive film and a method for making the same, which can overcome the limitations described.

DETAILED DESCRIPTION

Figure 1:
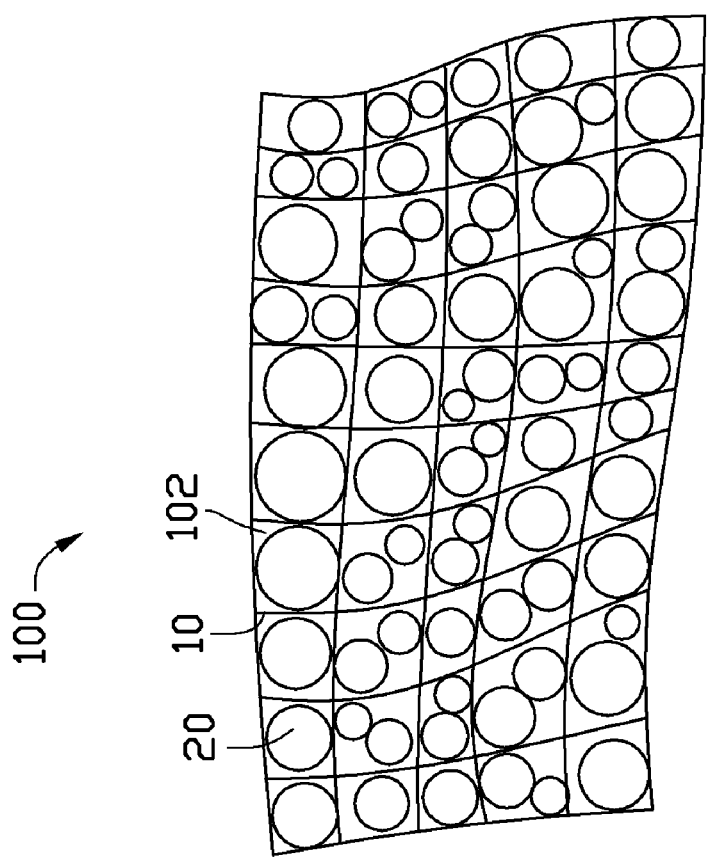
FIG. 1 is a schematic view of a conductive film, according to a first embodiment.

Referring to FIG. 1, a conductive film 100, according to a first embodiment, includes a carbon nanotube (CNT) film 10 and a plurality of conductive nanoparticles 20.

The CNT film 10 defines a plurality of holes 102 therein. The conductive nanoparticles 20 are received in the holes 102. It is to be understood that number of the nanoparticles 20 received in a hole 102 is determined by grain size of the nanoparticle 20 and dimensions of the corresponding hole 102. The nanoparticle 20 is selected from a group consisting of gold, silver, copper, aluminum, and any combination thereof. Since the nanoparticles 20 are received in the holes 102, conductivity of the conductive film 100 is enhanced.

Methods for making the CNT film 10 may include a direct growth method, a flocculating method, a pressing method or a pulling method.

The direct growth method is used to grow a CNT film directly on a substrate. The CNT film may be an aligned CNT film where CNTs are aligned in one or more directions, or a non-aligned CNT film where CNTs are twisted with each other and randomly distributed therein. The CNT film 10 may include two or more aligned CNT films stacked together. An angle α between the aligned directions of stacked CNTs in two adjacent CNT films is in a range of $0° \leq \alpha \leq 90°$. The CNT films are held together by van der Waals attractive force.

The flocculating method for making a CNT film includes the following steps: adding a plurality of CNTs to a solvent to create a CNT floccule structure in the solvent; separating the CNT floccule structure from the solvent; and shaping the separated CNT floccule structure into the CNT film. The CNT film made by the flocculating method includes a plurality of isotropic CNTs twisted with each other and randomly distributed therein and can form the CNT film 10 directly.

The pressing method for making a CNT film includes the following steps: forming an array of CNTs on a substrate; and pressing the array of CNTs using a compressing apparatus, thereby forming a CNT film. The CNT film made by the pressing method includes a plurality of CNTs aligned in one or more direction. The CNT film 10 can be obtained by stacking at least two CNT films together.

The pulling method for making a CNT film includes the following steps: providing a CNT array, specifically, a super-aligned CNT array, on a substrate; and pulling out the CNT film from the CNT array with a pulling tool (e.g., adhesive tape, pliers, tweezers, or another tool allowing multiple CNTs to be gripped and pulled simultaneously). The CNT film is an aligned CNT film and includes a plurality of CNT parallel to each other. The CNT film 10 may include two or more aligned CNT films stacked together.

Figure 2A:
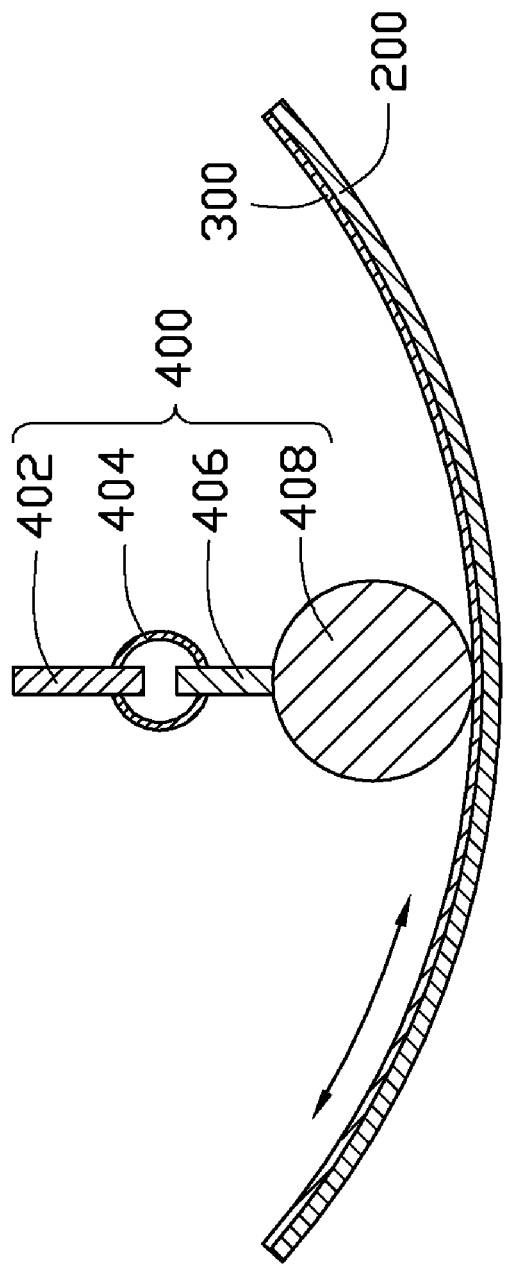
FIGS. 2A to 2B show a method for making the conductive film of FIG. 1, according to a second embodiment.
Figure 2B:
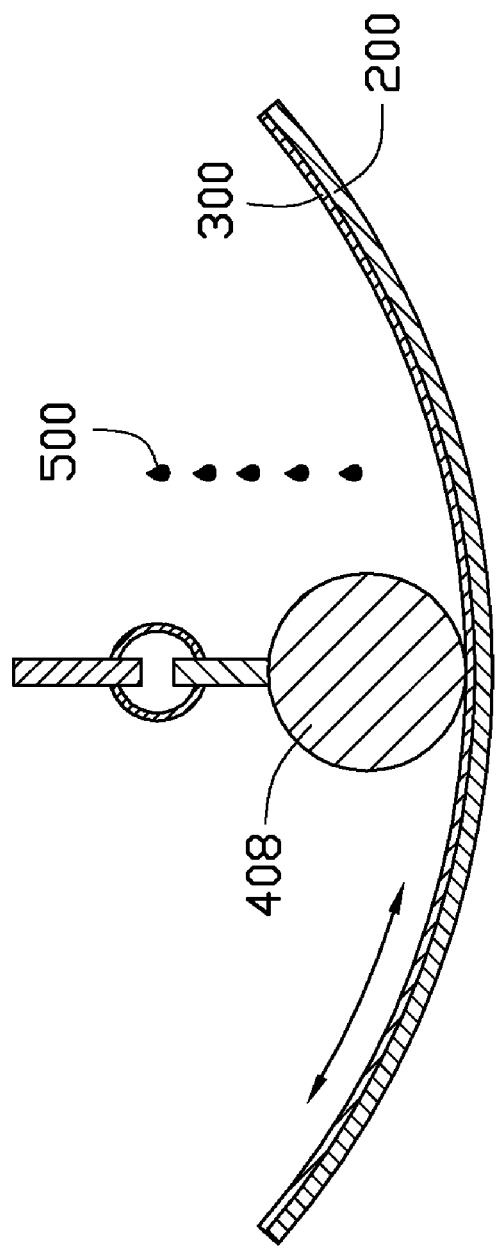

Referring to FIGS. 2A to 2B, a method for making the conductive film 100, according to a second embodiment, is shown. The method includes the following steps of: providing a CNT film, the CNT film defining a plurality of holes therein; forming a curable adhesive layer 300 on a substrate 200; attaching the CNT film on the curable adhesive layer 300; curing the curable adhesive layer 300 to bond the CNT film; adjusting a temperature of the CNT film in a range from about 7° C. to about 9° C.; dropping and rubbing a nanoparticle aqueous solution 500 in the CNT film, the nanoparticles aqueous solution 500 containing a plurality of nanoparticles; adjusting the temperature of the CNT film in a range from about 24° C. to about 26° C. and drying the CNT film to obtain the conductive film 100 on the substrate 200.

Material of the substrate 200 is a polyethylene terephthalate (PET). The substrate 200 may be curved inwards to form a container to allow aqueous solution therein to disperse uniformly in the CNT film. In this embodiment, a thickness of the substrate 200 is about 1 millimeter. The CNT film can be obtained by the above methods mentioned in the first embodiment.

A thickness of the curable adhesive layer 300 is about 3 to about 5 micrometers. The curable adhesive layer 300 is also curved inwards due to the curved substrate 200.

A printing tool 400 in used in the step of attaching the CNT film on the curable adhesive layer 300. The printing tool 400 includes a handle 402, a connecting portion 404, a rotating rod 406, and a rolling ball 408. The handle 402 is attached to the connecting portion 404. The connecting portion 404 is substantially a hollow ball. The rotating rod 406 is rotatably connected to the connecting portion 404. The handle 402 and the rotating rod 406 are connected to opposite sides of the connecting portion 404. The rolling ball 408 is fixed to the rotating rod 406 and rotates with the rotation of the rotating rod 406. The CNT film is attached to the outer circumference of the rolling ball 408. Then the rolling ball 408 with the CNT film contacts the curable adhesive layer 300 and moves back and forth on the curable adhesive layer 300. Therefore, the CNT film can be coated on the curable adhesive layer 300 uniformly.

In the step of curing the curable adhesive layer 300, the curable adhesive layer 300 is a light-curable adhesive layer 300 and can be cured by an ultraviolet light for example. After the curing process, the CNT film can be bonded on the adhesive layer 300.

In the step of adjusting the temperature of the CNT film in the range from about 7° C. to about 9° C., the substrate 200 with the CNT film can be placed in an atmosphere with the temperature of about 7° C. to about 9° C. Beneficially, the temperature of the CNT film is adjusted to about 8° C. The nanoparticle aqueous solution 500 is selected from a group consisting of a gold aqueous solution, a silver aqueous solution, a copper aqueous solution, an aluminum aqueous solution, any combination alloy of gold, silver and copper aqueous solution, and any combination aqueous solution thereof. In this embodiment, the nanoparticle aqueous solution 500 is a gold aqueous solution. When the temperature of the CNT film is about 8° C., the nanoparticle solution 500 is dropped in the substrate 200 and the rolling ball 408 moves back and forth to uniformly rub the nanoparticle aqueous solution 500 in the CNT film. Since the CNT is hydrophilic at the temperature in the range from about 7° C. to about 9° C., especially at the temperature of about 8° C., the nanoparticle aqueous solution 500 can fill the holes 102 of the CNT film 10.

In the step of adjusting the temperature of the CNT film in the range from about 24° C. to about 26° C., the substrate 200 with the CNT film can be placed in an atmosphere with the temperature of about 24° C. to about 26° C. Beneficially, the temperature of the CNT film is adjusted to about 25° C. Since the CNT is hydrophobic at the temperature in the range from about 24° C. to about 26° C., especially at the temperature of about 25° C., the water in the nanoparticle aqueous solution 500 is repelled by the CNT film 10 and the nanoparticles in the nanoparticle aqueous solution 500 is left and received in the holes 102.

Properties of hydrophilicity of the CNT at the temperature of about 7° C. to about 9° C. and hydrophobicity of the CNT at the temperature of about 24° C. to about 26° C. are utilized for making the conductive film 100. Therefore, the nanoparticles 20 can be received in the holes 102 to enhance conductivity of the conductive film 100.

A method for making a conductive film, according to a third embodiment, is also provided. The differences between the method of this embodiment and the method of the second embodiment are that steps of forming a CNT film on the curable adhesive layer and curing a curable adhesive layer are different from those in the second embodiment.

In this embodiment, after a step of forming a curable adhesive layer on a substrate, the method includes steps of: forming a first CNT sub-film on the curable adhesive layer 300; curing the curable adhesive layer 300 to bond the first CNT sub-film; forming a second CNT sub-film on the first CNT sub-film to cooperatively obtain the CNT film on the curable adhesive layer 300.

A thickness of the first CNT sub-film is about 50 to about 100 nanometers. An ultraviolet light is used for curing the curable adhesive layer 300. A thickness of the second CNT sub-film is about 1 to about 2 micrometers. The first CNT sub-film and the second CNT sub-film are held together by van der Waals attractive force.

Since the second CNT sub-film is attached on the first CNT sub-film after the curable adhesive layer 300 is cured, more CNT frameworks in the obtained CNT film are exposed from the curable adhesive layer to be immersed in a nanoparticle aqueous solution in a subsequent step.

In alternative embodiments, the step of forming the curable adhesive layer 300 on the substrate 200 may be omitted. The CNT film is adhesive, because the CNTs have relatively large specific areas, so that the CNT film can be directly attached to the substrate 200.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A method for making a conductive film, comprising:
   providing a carbon nanotube film defining a plurality of holes therein;
   attaching the carbon nanotube film on a substrate;
   adjusting a temperature of the carbon nanotube film in a range from about 7° C. to about 9° C. so that the carbon nanotube film is hydrophilic;
   dropping and rubbing a nanoparticle aqueous solution in the carbon nanotube film, the nanoparticles aqueous solution containing a plurality of nanoparticles, the nanoparticle aqueous solution filling the holes of the carbon nanotube film; and
   adjusting the temperature of the carbon nanotube film in a range from about 24° C. to about 26° C. so that the carbon nanotube film is hydrophobic and drying the carbon nanotube film to obtain the conductive film on the substrate; wherein in the conductive film, water in the nanoparticle aqueous solution is repelled by the carbon nanotube film and the nanoparticles in the nanoparticle aqueous solution are left and received in the holes.

2. The method of claim 1, further comprising forming a curable adhesive layer on the substrate, wherein the carbon nanotube film is attached on the curable adhesive layer prior to attaching the carbon nanotube film on the substrate.

3. The method of claim 2, further comprising: curing the curable adhesive layer prior to adjusting the temperature of the carbon nanotube film in the range from about 7° C. to about 9° C.

4. The method of claim 2, wherein attaching the carbon nanotube film on the substrate comprises:
   forming a first carbon nanotube sub-film on the curable adhesive layer;
   curing the curable adhesive layer to bond the first carbon nanotube sub-film; and
   forming a second carbon nanotube sub-film on the first carbon nanotube sub-film to cooperatively obtain the carbon nanotube film on the curable adhesive layer.

5. The method of claim 1, wherein a material of the substrate is a polyethylene terephthalate.

6. The method of claim 1, wherein the nanoparticle aqueous solution is selected from a group consisting of a gold aqueous solution, a silver aqueous solution, a copper aqueous solution, an aluminum aqueous solution, any combination alloy of gold, silver and copper aqueous solution, and any combination aqueous solution thereof.

7. The method of claim 1, wherein when the temperature of the carbon nanotube film is adjusted to about 8° C., the nanoparticle aqueous solution is dropped and rubbed in the carbon nanotube film.

8. The method of claim 1, wherein when the temperature of the carbon nanotube film is adjusted to about 25° C., the carbon nanotube film is dried to obtain the conductive film on the substrate.

* * * * *